INVENTOR
Peter Dahlem
BY Paul H. Smolka,
HIS ATTORNEY

United States Patent Office 3,347,122
Patented Oct. 17, 1967

3,347,122
METAL SHEARS
Peter Dahlem, Dusseldorf-Eller, Germany, assignor to Lindemann Maschinenfabrik G.m.b.H., Dusseldorf, Germany
Filed Oct. 21, 1965, Ser. No. 499,623
Claims priority, application Germany, Nov. 18, 1964, L 49,315
3 Claims. (Cl. 83—157)

ABSTRACT OF THE DISCLOSURE

A shearing machine in which the workpiece is forwardly guided upon a tabular surface to two cooperating knives of which one is stationarily located at the forward end of said tabular surface and the other in a head member vertically reciprocable in the machine frame. A back-up member having a tabular top extending securely in spaced relation downwardly from said head member to leave a window therebetween permitting the sheared off portion of the workpiece to pass therethrough. Said tabular top in preshearing condition continues said tubular surface and helps to support the introduced workpiece, and in depressed position during and after the shearing operation lets said window receive and freely pass the cut off portion of the workpiece.

Background of invention

This invention relates to improvements in metal shears of the character used for cutting scrap metal, logs, blocks, and other items, as well as for the splitting up of nonmetallic material.

Shears for this purpose have been proposed and used heretofore in which the work or material to be cut is pushed by a feeder over a tabular support surface between a pair of cooperating knives which are moved relatively for cutting the material. This action has been employed especially for reducing scrap metal.

Where the work or piece to be cut is pushed forward over the lower knife so that its end portions overhang the knife or its center of gravity projects in unsupported relation therefrom, this piece is subject to slippage interfering with the proper cutting operation. The feed member must be withdrawn before the hold-down member or clamping means can be brought into secure engagement with the work, but this allows time for misalignment of the piece before it can be held securely.

Summary of invention

One object of this invention is to overcome the disadvantages of shears of the character described and to provide for secure and effective holding of the work or piece to be cut in place before and during the shearing operation.

Another object of the invention is to provide a supporting surface for the work behind the cutting plane to retain the work in place prior to the cutting operation said surface being withdrawn to permit such cutting operation.

These objects may be accomplished, according to my invention, by providing a back-up member with a supporting top which underlies the work as it is positioned initially over the fixed or first knife and which is withdrawn as the movable or second knife is brought into severing relation with the piece to be cut. Said back-up member is fixed securely to the movable head carrying the second knife and moves down with the head after the workpiece is clamped securely in place. A window formed between the supporting top of the back-up member and the body of the head permits the workpiece to be placed into cutting position and its cut off portion to exit from the machine. This enables one operating instrument to be connected with the head for manipulating both the head and the back-up member and making unnecessary a separate operation of the latter, although such separate operation may be effected, if desired.

Brief description of the drawing

One embodiment of the invention is illustrated in perspective views in the accompanying drawings, in which.

Description of specific embodiment

Figure 1:
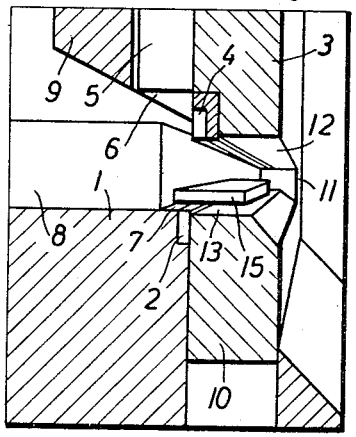
FIG. 1 shows a vertical section through the shears, with the workpiece placed over the bottom knife and the feed member in feeding position.

In the embodiment shown in the drawings, the shears comprise a fixed base 1 having a lower knife 2 securely mounted at the forward edge of the tabular surface 7 of the base.

A movable head resting in suitable guide means for vertical reciprocating movement rigidly holds an upper knife 4 in shearing relation to the bottom knife 2. The knife 4 can be secured in any suitable manner to the head 3, but should be detachable for replacement or sharpening.

A work clamping plate 5 is mounted in suitable guides in the machine beside the head 3 and is operated by suitable means for mopement of the clamping lower edge 6 of this plate into engagement with the work. The clamping plate 5 operates in opposed relation to the upper surface 7 of the base 1 over which the work is fed by a feed member 8 which reciprocates horizontally thereover, being operated by suitable means (not shown) and within guideways provided in the machine. The feed member 8 pushes the work across the surface 7 and over the knife 2 where it is held by the clamping member 5, as illustrated in the drawings.

Figure 2:
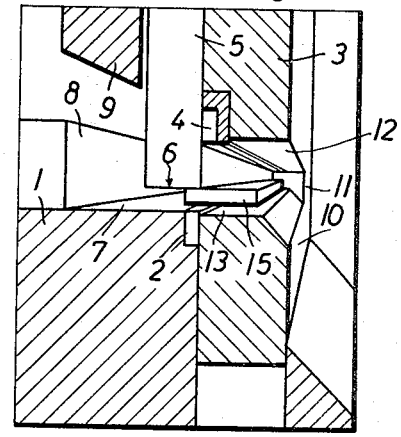
FIG. 2 shows the feeding member withdrawn to permit the clamping member to be moved into clamping engagement with the workpiece.
Figure 3:
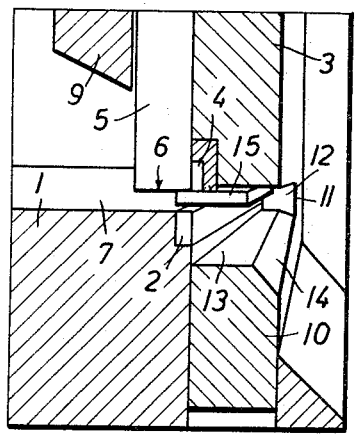
FIG. 3 shows the head with the upper knife moved down to the workpiece just prior to the cutting operation.
Figure 4:
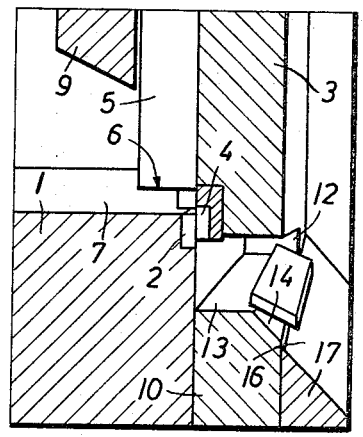
FIG. 4 shows the further downwardly moved head following the cutting operation.

The head 3 is rigidly connected, for example, by lateral upright portions 11, with a lower back-up member 10 which is reciprocated by and with the former. The back-up member 10 is spaced from the head 3 to leave a window 12 therebetween through which the work is pushed into and beyond the cutting plane of the machine. The member 10 has tabular top 13 spaced from the lower edge portion of the head 3 and forming a continuation of the supporting surface 7 when the head 3 is raised prior to the cutting operation. At its outer edge, the tabular top 13 is beveled at 14 to facilitate the discharge of the severed portion of the work, which work is indicated at 15 in FIGS. 1 to 3.

While the operation of the shears will be evident from the foregoing description and the illustration in the drawings, it is pointed out that the sequence of steps are shown in the several views of the drawings.

Initially the workpiece 15 to be cut by the knives 2 and 4, is fed over the surface 7 by the action of the feed member 8 in successive short strokes of the latter, with a cut made on the projecting portion of the work 15 for each stroke. The workpiece 15 is normally supported on the support surfaces 7 and tabular top 13 which, extend in bridging relation across the bottom knife 2 prior to the cutting operation. After the workpiece has been pushed over the knife 2, the feed member 8 is withdrawn before the clamping plate 5 is lowered into clamping relation with the workpiece 15. During this manipulation, the tabular top 13 of the back-up member 10 will hold the workpiece in proper relation to the cutting plane until the workpiece can be secured in this position by the clamping plate 5 and until the head 3 has descended to cut off a portion of the workpiece by the shearing action of knives 2 and 4. Thereafter the cut off portion of the workpiece falls through the window 12 down a discharge surface 16 provided on a front plate 17. The head 3 is then raised, moving the tabular top 13 of the back-up member 10 up into substantial alignment with the support surface 7. Thereafter, the clamping plate 5 is raised and the feed member 8 operated again to move the remaining portion of the same workpiece 15 or another piece across the surface 7 of the base 1 into cutting position between the knives 2 and 4. The before described operation may be repeated as long as required.

While the invention has been illustrated and described in one embodiment, it is recognized that variations and changes may be made therein without departing from the invention set forth in the claims.

I claim:

1. In a shearing machine including a stationary first knife and a reciprocable second knife cooperating with each other in a substantially vertical shearing plane the improvement comprising in combination a machine frame; a tubular surface therein to support a workpiece forwardly fed towards the shearing plane; the said first knife located in the forward edge of said tabular surface in front of and next to the shearing plane; a vertically reciprocable head member beyond the shearing plane including the second knife in its bottom surface in shearing relation to the first knife; a back-up member with tabular top for the operated on workpiece downwardly rigidly extending in spaced relation from the head member to reciprocate therewith and leading a windowlike interspace between said bottom surface and said tubular top, the latter in preshearing condition continuing the said tubular surface to support the introduced workpiece and in depressed position during and after the shearing operation letting the interspace receive and pass therethrough the cut off portion of the workpiece; and a clamping member vertically reciprocable above said tubular surface in front of the shearing plane to stabilize the operated upon workpiece.

2. A shearing machine according to claim 1 wherein the tabular top of the back-up member is at least partially beveled away from the shearing plane.

3. A shearing machine according to claim 1 comprising a feeder for the workpiece horizontally reciprocable above the tabular surface and adapted to be retracted before the operation of the clamping means to avoid the same.

References Cited
UNITED STATES PATENTS

| | | | |
|---|---|---|---|
| 488,659 | 12/1892 | McCool et al. | 83—198 |
| 1,925,915 | 9/1933 | Allsworth | 83—165 |
| 2,400,793 | 5/1946 | Tuska | 83—157 |
| 2,549,560 | 4/1951 | Archer | 83—157 |
| 3,187,613 | 6/1965 | Behling | 83—278 X |
| 3,260,145 | 7/1966 | Giordano | 83—157 X |

JAMES M. MEISTER, *Primary Examiner.*